Patented Feb. 27, 1940

2,191,509

UNITED STATES PATENT OFFICE 2,191,509

CANNED FOOD COMPOSITION

James F. Walsh, Chicago, Ill., and Archie L. Rawlins, Hammond, Ind., assignors to American Maize-Products Company, a corporation of Maine No Drawing. Application November 5, 1937, Serial No. 172,900

7 Claims. (Cl. 99—182)

Our invention relates to edible compositions composed of canning foods and starch thickeners and more particularly to improved cornstarch-protein thickeners that may be subjected to canning and sterilizing temperatures and stored for long periods of time without losing their body and water retaining properties.

Various food canning industries have heretofore utilized thickening agents in the processing of their canned foods to give the food product a better body and to permit the use of a maximum amount of water. The efficiency of the thickening agent is proportional to the amount of water that it will absorb and retain. In addition to possessing the essential physical properties the thickening agent should also have food value. A common example of thickening agents generally used in the food industry is starch. The starch heretofore used possesses certain desired thickening properties but does not possess the maximum water absorption properties desired and does not produce a food composition that will remain stable under canning and sterilizing conditions or storage for long periods of time. When foods, such as soups and gravies containing the usual starch thickeners are processed for canning at relatively high temperatures and are sterilized by heating after canning, the starch is partially converted to soluble dextrines and sugars which have substantially less consistency than the starch and which will not retain the desired amount of water. Consequently, when these starch conversion products are formed the canned food loses its desired body and a watery, non-appetizing appearing product, of low sales value, results.

The above described conversion of the starch during canning and sterilizing is produced by the relatively high processing temperatures, which are accompanied by pressure when the food is heated in hermetically sealed containers. In accordance with recent pure food laws the canned foods must be sterilized after sealing in the cans by heating the latter to a sufficiently high temperature to kill all active organisms in the food. This usually requires a temperature of about 250° F. Since the cans are sealed this heating produces the necessary pressure required to effect conversion of the starch.

The canned foods oftentimes contain free acids which will aid in the starch conversion, in accordance with well known principles. These acids in combination with the above mentioned heat and pressure establish ideal conversion conditions. Furthermore, when these acids are present in appreciable amount they alone will effect conversion over a period of time of the usual starch thickener. Examples of this are seen in cold-processed food compositions such as mayonnaise, sandwich spreads, chow-chow and other pickeled products. In these products starch is used as a thickener to give a better appearing and more stable product and to permit the use of a maximum amount of water.

Dry processed corn flour and wheat flour have also been used as thickening agents for certain canned foods but they, like cornstarch, do not possess sufficient water absorption properties, and due to their varying protein content are not consistent in their resistance to the thinning action of the heat and acids encountered in canning foods.

An object of our invention is to provide edible food compositions containing cornstarch-protein thickeners that will remain stable under canning and sterilizing conditions and will resist the action of contained acids over a period of time.

In accordance with this invention, we have discovered that the desired type of canned food compositions, stable against relatively high temperatures and food acids, may be obtained by use of certain cornstarch-protein admixtures as the thickening agent. We have found that certain cornstarch-protein admixtures have a relatively high resistance to the temperatures and pressures encountered in canning and sterilizing foods, even in the presence of acids, and have high resistance to the action of acids contained in or associated with canned foods both of the cold and hot processed types. These cornstarch-protein admixtures, due to their method of manufacture, have accurately controlled amounts of protein and therefore are consistent in their starch conversion inhibiting action. The cornstarch-protein thickener is associated, combined or admixed in any suitable manner with the food substance to be thickened. The proportions of the cornstarch-protein thickener and the food material forming the compositions of our invention will vary with the type of food, and with the amount of thickener required to give the desired consistency to the different food materials, such as soups, gravies, spaghetti sauces and pork and beans.

The cornstarch-protein thickener used in our invention may vary substantially for different food compositions with respect to the relative proportions of starch and protein constituents. For example, the proportions of the starch and protein contents of this thickener may be substantially equal, that is approximately 50% of starch and 50% protein. In the usual case, however, this relatively large amount of protein is not necessary and for most purposes the starch-protein admixture would have an approximate composition of about 90% to 95% starch and about 5% to 10% protein. The relative amounts of each of these constituents may be increased or decreased, as suggested, to suit various requirements.

Our cornstarch-protein admixture that is advantageously used to inhibit conversion and maintain the food composition in stable form as above explained, consists of the material commonly known as "mill head" starch which has been subjected to certain further treatments. This "mill head" starch contains the great majority of corn proteins and starch as well as some of the soluble materials present in the corn. The "mill head" starch is normally obtained in the manufacture of starch from corn in which the corn is first steeped in sulphurous acid and then sent through a series of mills that remove the corn germ which is subsequently separated from the starch and protein by flotation. The remaining material which contains starch, protein and hulls or cellulosic substances is ground and passed through a series of screens that remove the coarse and fine hulls or cellulosic materials, leaving what is known in the art as "mill head" liquor. In order to render the "mill head" liquor suitable for use in our invention it may be treated as follows:

The liquor is filtered and washed to remove the bulk of the soluble materials. The remaining insoluble materials which consist of primarily starch and proteins usually in the proportions of about 90% to 95% starch and 5% to 10% protein are heated to about 152° F. This heating effects a slight pasting or gelatinizing of the starch, the purpose of which is to give the starch-protein admixture maximum water absorption characteristics and thereby render it most efficient as a food thickener. The water absorption capacity of this gelatinized corn starch-protein thickener, which is substantially free of solubles, is approximately twice that of common unmodified starch. As above described, the amount of protein present in our starch-protein thickener may vary widely from about 5% to about 50%. When a protein content of about 5% to 10% is desirable the above described "mill head" starch material is used, after treatment, as a suitable thickener. However, when higher protein contents are desired or necessary for inhibiting the conversion action, a different type of starch material would be used. We have found, for example, that the gluten suspension which normally overflows from the end of the starch tables, as a result of the well known starch tabling operations may be used either in part or in entirety as a suitable thickener. If used alone, after proper purification and concentration, this gluten suspension will contain about 50% starch and 50% proteins, and as such will serve as a satisfactory thickener for some foods. Instead of using this gluten material alone however, it may be admixed with "mill house" starch or with starch obtained from any other sources and having a relatively low protein content, in order to increase the protein content to a desired higher amount. For example, the normal "mill head" starch containing from 5% to 10% protein might be mixed with the treated gluten material to give the thickener a protein content of about 25%.

The protein content of the treated starch-protein admixture serves the principal purpose in this invention of substantially retarding the conversion of the starch when the food thickener composition containing this starch-protein admixture as thickener, is subjected to the conversion inducing action of heat, pressure and acids. The protein material serves its purpose particularly well when the acidity of the food composition is not relatively high, that is, when the acids present are in sufficiently small amount or concentration to have initially only a relatively small starch conversion capacity. These conditions are present in canned foods in which the acid naturally present in the food, or which has been added to the food in canning or pickling, is of relatively weak concentration and generally organic in nature. When such acids are present in the usual amounts common to canned foods and the food composition is heated under pressure for periods of about one-half hour to three hours for cooking or sterilizing purposes, the protein content of the starch-protein admixture used in our invention will inhibit the normal conversion action of these acids and therefore the food composition will retain its desired consistency and stability. Likewise in the manufacture of cold processed foods, such as mayonnaise, the protein content of our starch-protein thickener will serve the purpose of inhibiting the slow gradual conversion action of the organic acids present in this composition over a period of time such as is normally encountered during storage and shipment of the food products.

The starch-protein material of this invention shows a substantial improvement in water absorbing and retaining power and produces a more valuable canned food product due to the fact that it admixes very uniformly with the canned food, which mixture is stable. For example, when our cornstarch-protein thickener is used in sauces for spaghetti and pork and beans the sauce has a desirable uniform body and will adhere to the spaghetti, etc. In contrast thereto the regular starch thickeners heretofore used do not mix uniformly with the canned food and in relatively short time tend to separate out producing a thin watery-like product of low sales value.

The terms "pasting or gelatinizing" as used in the specification and claims herein is intended to refer to a slight heat treatment of the starch-protein material such that the material is rendered slightly pasty or gelatinous but without effecting hydrolysis of the starch into dextrin or other soluble components and without appreciable rupturing of the starch granules such as will occur when starch is heated to about 200° F. or above. The slightly pasted or partially gelatinized starch of this invention contains substantially no appreciable amount of dextrin, sugars or soluble substances and consists of primarily a fine admixture of corn starch and protein, the starch granules of which have been swollen but not substantially ruptured. The final product is a substantially odorless, tasteless, edible product.

It is to be understood that various modifications and changes may be made in the above described processes and materials without departing from the scope of our invention. Various canned foods other than soups, gravies, mayonnaise, sauces, etc., may be used. Some of the novel features of this invention are defined in the appended claims.

We claim:

1. A stable edible canned food composition comprising a food containing an appreciable amount of water, and a cornstarch-protein thickener that has a water absorption capacity of approximately twice that of common unmodified starch so that it prevents the composition from thinning when heated to sterilization temperatures, said thickener consisting substantially of an intimate admixture of starch and water-insoluble protein as obtained from corn, said starch being partially gelatinized.

2. A stable edible canned food composition comprising a food containing an appreciable amount of water, and a cornstarch-protein thickener that prevents the composition from thinning when heated to sterilization temperatures, said thickener consisting substantially of "millhead" starch freed of water-soluble proteins and partially gelatinized and having a water absorption capacity of approximately twice that of common unmodified starch.

3. As a new article of manufacture a cornstarch-protein, canned food thickener that prevents thinning of the canned-food when subjected to sterilizing temperatures, said thickener comprising an intimate admixture of starch and water insoluble proteins as obtained from corn, and being washed substantially free of water soluble proteins and being slightly pasted but without hydrolysis of the starch or appreciable disruption of the starch granules, and having a water absorption capacity of approximately twice that of common unmodified starch.

4. A cornstarch-protein thickener as defined in claim 3, in which the protein is present in an amount of about 5% to 50% and substantially prevents the starch from being converted when subjected to sterilizing temperatures.

5. A method of preparing a thickener for admixing with canned foods which thickener will prevent such foods from thinning when subjected to sterilizing temperature, comprising washing a ground mixture of starch and protein, as obtained from corn, with water to remove substantially the water soluble solids in said mixture and slightly pasting without hydrolyzing the remaining mixture of corn starch and water insoluble proteins whereby the resulting product possesses a water absorption capacity approximately twice that of common unmodified starch, is not solubilized and will resist conversion into dextrine when subjected to sterilizing temperatures.

6. A method as defined in claim 5 and in which the protein of the thickener is present in an amount of about 5% to 10% and the starch-protein admixture is heated sufficiently to effect slight pasting without appreciable rupture of the starch granules.

7. An edible, dried, partially pasted, water-absorbent starch-protein material for use as an adjunct to foods which normally carry a substantial water content, said material being substantially free of water soluble substances, substantially free of objectionable odors and taste and slightly pasted sufficient to provide a water absorption capacity appreciably above but not greater than about twice that of common, unmodified starch, and without hydrolysis of the starch of said material into dextrins and sugars, the starch granules of said material being swollen but not appreciably ruptured.

JAMES F. WALSH.
ARCHIE L. RAWLINS.